(12) United States Patent
Mayer et al.

(10) Patent No.: US 7,896,433 B2
(45) Date of Patent: Mar. 1, 2011

(54) SITTING ARRANGEMENT FOR AUTOMOTIVE VEHICLES

(75) Inventors: Hannes Mayer, Wuppertal (DE); Ingo Thiele, Wuppertal (DE)

(73) Assignee: Grammer AG, Amberg (DE)

( * ) Notice: Subject to any disclaimer, the term of this patent is extended or adjusted under 35 U.S.C. 154(b) by 78 days.

(21) Appl. No.: 10/900,064

(22) Filed: Jul. 27, 2004

(65) Prior Publication Data

US 2005/0110310 A1    May 26, 2005

(30) Foreign Application Priority Data

Jul. 28, 2003   (DE) .................................. 103 34 595

(51) Int. Cl.
*A47C 7/62*   (2006.01)
(52) U.S. Cl. .................................. 297/188.06; 297/440.2
(58) Field of Classification Search ............. 297/188.04, 297/188.06, 440.2, 391, 217.3, 397
See application file for complete search history.

(56) References Cited

U.S. PATENT DOCUMENTS

| | | | |
|---|---|---|---|
| 2,481,943 A * | 9/1949 | Murphy et al. ............... | 297/238 |
| 2,566,757 A | 9/1951 | Sylvia | |
| 3,253,859 A | 5/1966 | Tom | |
| 3,337,268 A | 8/1967 | Earl | |
| 4,746,168 A * | 5/1988 | Bracesco .................... | 297/440.2 |
| 4,792,183 A * | 12/1988 | Townsend, III ............... | 297/163 |
| 5,269,229 A * | 12/1993 | Akapatangkul ................ | 108/44 |
| 5,275,466 A * | 1/1994 | Rentchler, Jr. ........... | 297/411.25 |
| 5,848,661 A * | 12/1998 | Fu ................................ | 180/273 |
| 5,927,813 A * | 7/1999 | Nemoto ........................ | 297/391 |
| 6,105,839 A * | 8/2000 | Bell .............................. | 224/275 |
| 6,109,690 A * | 8/2000 | Wu et al. ................... | 297/216.13 |
| 6,199,948 B1 * | 3/2001 | Bush et al. ................. | 297/217.3 |
| 6,216,927 B1 * | 4/2001 | Meritt ........................... | 224/275 |
| 6,655,745 B2 * | 12/2003 | Fohrenkamm et al. ....... | 297/481 |
| 6,830,292 B1 * | 12/2004 | Yoda ........................ | 297/188.06 |
| 6,994,401 B1 * | 2/2006 | Fischer et al. ........... | 297/452.14 |

FOREIGN PATENT DOCUMENTS

| | | |
|---|---|---|
| DE | 27 18 237 | 11/1978 |
| DE | 195 44 267 | 6/1997 |
| DE | 100 29 624 | 1/2002 |

* cited by examiner

*Primary Examiner* — Sarah B McPartlin
(74) *Attorney, Agent, or Firm* — Andrew Wilford

(57) ABSTRACT

A seating arrangement for a motor vehicle having at least one front vehicle seat and at least one rear vehicle seat in which the front vehicle seat has a backrest provided at a backrest frame as a unit which can be attached at least indirectly on the backside of the seat back and receives the headrest. A display screen or monitor can be mounted in that frame in a field or space specifically provided for that unit.

9 Claims, 3 Drawing Sheets

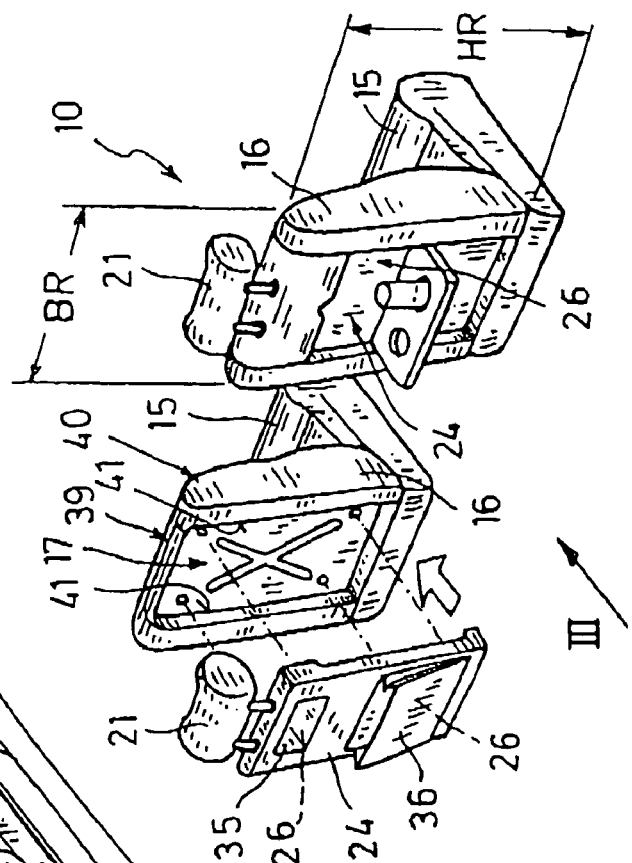
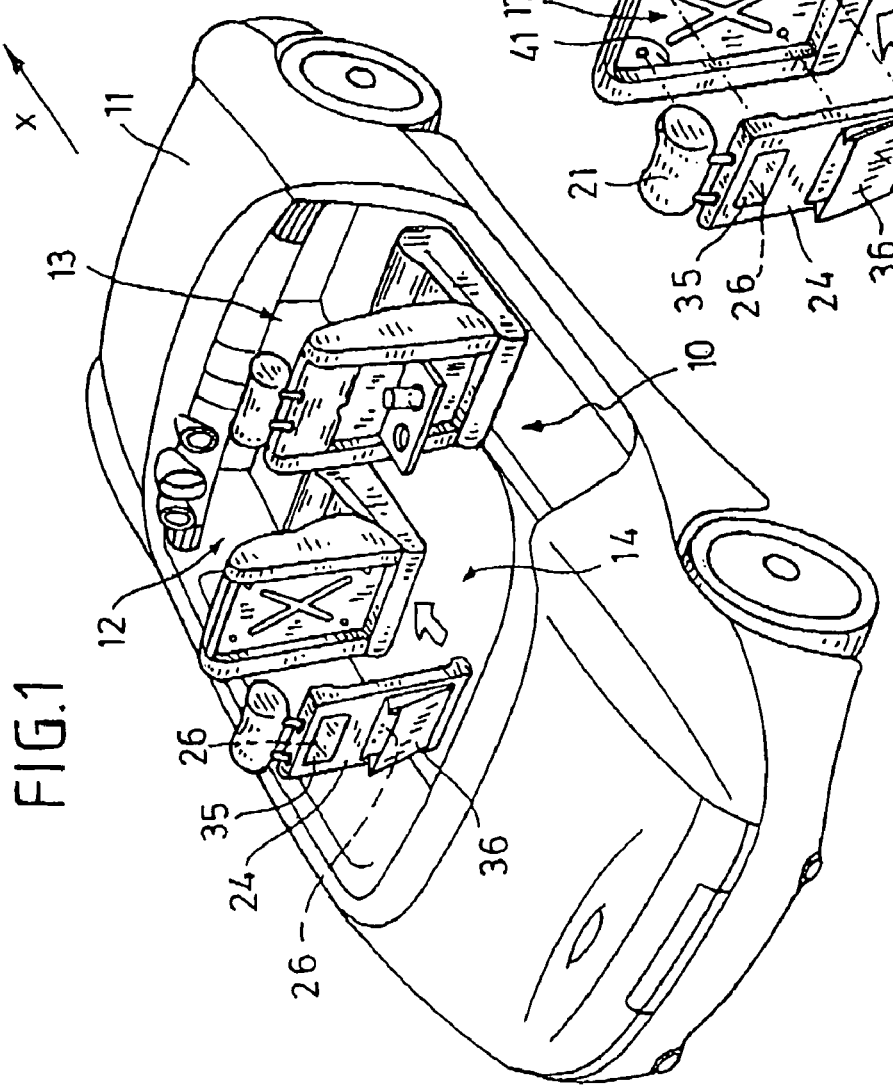

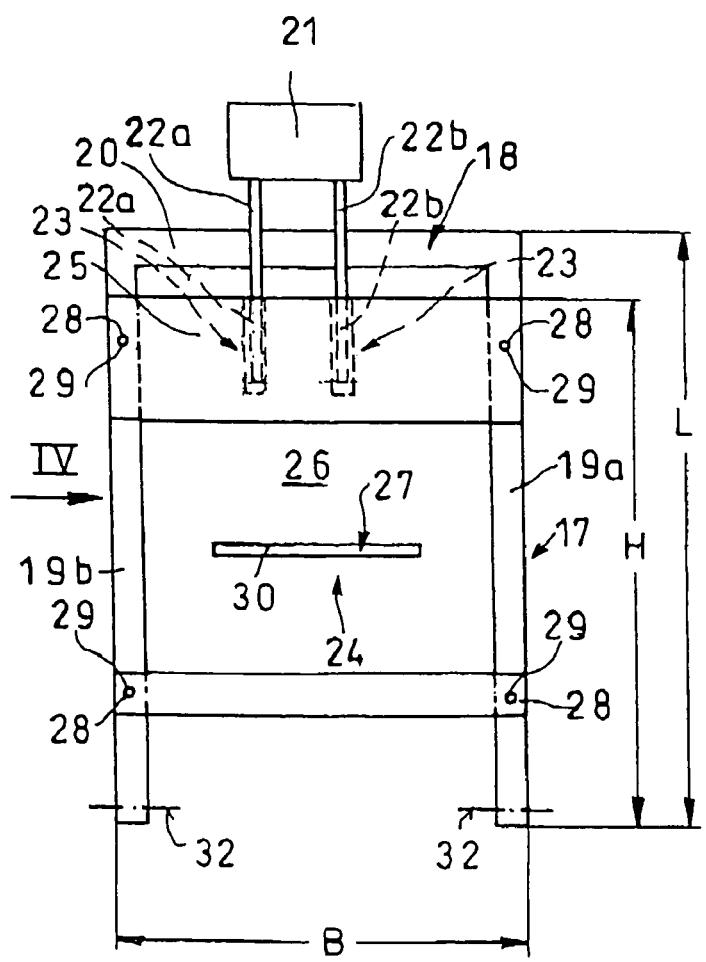
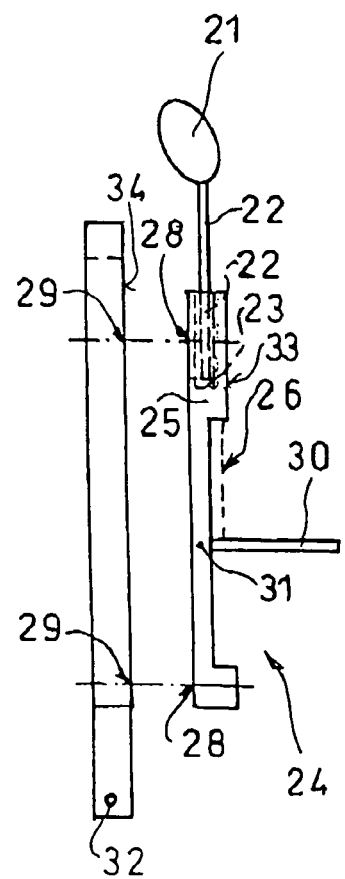

SITTING ARRANGEMENT FOR AUTOMOTIVE VEHICLES

FIELD OF THE INVENTION

The invention relates to a seating arrangement for automotive vehicles having at least one front seat, normally a bucket seat, and at least one back seat. The front seat has a back rest having a support structure in the form of a frame carrying a head rest. A back side of the front-seat back carries a display or cup holder.

Such seating arrangements are known and widely used. Typically the two front automotive vehicle seats of a passenger limousine are formed as single seats each with a seat support structure in the form of a reclining frame which is provided with cushioning. The reclining frame is thus of a type which has an upright U open upward and typically has two substantially vertically oriented beams spaced apart from one another transversely to the longitudinal direction of the vehicle and having upper free ends interconnected by a transverse traverse. The two beams are pivotable at their lower ends about an axis running transverse to the vehicle movement direction and are arrestable in a plurality of angular positions.

The reclining frame in addition is conventionally provided with a number of spring elements which serve to enable the requisite elasticity for the desired seating comfort to be achieved.

For fastening the head-rest support on the back of the front seat, the back rest usually has two support bars which are held in a holder in a side of the back-rest frame. For this purpose, a guide is provided in the upper transverse traverse such that the two support bars pass through the upper transverse traverse of the back-rest frame substantially vertically.

Typically, head-rest supports are fabricated by another enterprise from that which makes the back rest of the vehicle seat so that to enable the structural connection of the head-rest support to the back rest, a number of communications are required between the head-rest support manufacturer and the seat manufacturer with respect to the mounting of the head-rest support. One of the problems in this connection is that the mounting of the holder for the head-rest support on the back-rest frame must be accommodated to the fact that the available room for it is very small. An optimum matching of the head-rest support on the back rest, especially with respect to its adjustability and its precise positioning, can be achieved only to a limited extent.

The two support bars of the head-rest support are usually arranged relatively close together. Even when the two support bars are fixed to the outermost edges or ends of the head-rest support, the points at which the support bars engage the transverse traverse are relatively close in a region at the center of the transverse traverse. The transverse traverse moreover is often formed to be very thin so that, in the case of a crash, the head-rest support can twist the transverse traverse under the substantial force applied thereto and thus prevent injury to a vehicle occupant.

With seating arrangements of the state of the art, a special role is played by the use of the back side of the back rest of the front seat for certain functions. Thus, displays screens for video or DVD devices, computers including displays and keyboards, cup holders, etc., can be provided thereon. The application of such functional units to the back rest of the front seat is associated with a high cost for fabrication of the back rest.

Thus, for example, it is known from German patent document 41 09 497 (U.S. Pat. No. 5,207,471) to make a working unit consisting of a flat display screen and a keyboard by means of fastening elements behind a back rest of a vehicle seat as may be required, whereby suspensions arms are provided which engage the carrier bars of the head-rest support.

From German patent document 100 29 624, which is the starting point for the invention, a seating arrangement is proposed which has a stowage compartment which is usable for a variety of purposes, either in the back rest or in the head-rest support of the front seat. An adjustable head-rest support is mounted on the portion of the back rest such that the carrier bars of the head-rest support are held by a holder which is arranged on a transverse traverse of the back frame of the back support as is typically the case.

OBJECT OF THE INVENTION

Starting from this state of the art, it is an object of the invention to improve the seating arrangement as described above such that with a simple construction, an improved mounting of the head-rest support on the back frame and the functioning unit on the back rest is possible.

SUMMARY OF THE INVENTION

The invention achieves this object in that a support element is provided which is separate from the seat rest support structure, that is fastenable on the seat rest support structure, especially on the back side of the seat rest support structure, in that with the support element, a holder is arranged for at least one support bar of the head-rest support, and in that the support element provides a mounting field for the functional unit. The principle of the invention thus is substantially that the head-rest support is assembled together with the mounting field for the functional unit in a common structural unit which is mounted as a whole on the back-rest frame. The unit forming the support element thus encompasses a force-conducting component which in the case of a crash conducts the force which is applied to the head rest directly into the frame structure of the back-rest frame. For this purpose, the force-conducting component can be to a large measure resistant to twisting and thus for example can have a significantly enlarged cross section relative to the cross section of conventional transverse traverses of back-rest frames and a more stable construction.

As a whole from the structural point of view, the support element, the head-rest support and the functional unit, for example, with respect to force transmission, are optimally matched to one another since the entire structural unit is affixed to the back-rest frame. Consequently, expensive mounting for the individual parts is eliminated, affording the possibility for the holder to be dimensioned optionally. In the state of the art, because of the small space available for the holder, limited by the dimensions of the transverse traverse, the holder was relatively small but can be significantly increased in accordance with the invention.

Since especially for the relative adjustment of the head-rest support with respect to the stationary rest frame, a special guide for the displacement of the support bar, especially with corresponding guide sleeves is required, the components provided for height adjustment can be fabricated with the requisite tight tolerances and high dimensional accuracy and can be correspondingly assembled, so that an optimum interconnection of the individual parts with one another is possible.

In addition, it is possible for the structural elements required for height adjustment, for example a device for electrical height adjustment of the head-rest support, to be mounted in a simpler manner on the support element than was the case with the back-rest frame of the state of the art. There the components required for a height adjustment of the head-rest support had to be inserted in a very narrow space which was laterally limited by the two beams of the rest frame which led to a complicated mounting.

Since according to the invention the holder for the head-rest support is affixed to a separate support element, an advantageous premounting of the components can be effected with better accessibility to the fastening bracket of the holder.

The solution according to the invention ensures the possibility of an improved force transfer in the case of a crash for the forces which act upon the head-rest support to the frame structure of the seat frame since the support element can be fastened directly to both beams of the seat frame or at least directly in the vicinity of the beam so that a direct force transfer is possible. Thus by a corresponding configuration of the support element or a force-transmitting component arranged on the support element, large forces can be transferred.

Finally the seating arrangement according to the invention also enables a simple replacement of the invention unit, the head-rest support and the support element, so a modular construction can be available. Such a modular construction also facilitates a replacement of a mounted support element, for example for the case in which a user desires a different function unit or in the case of an accident, significant components must be replaced. The support element can be provided with especially simpler formed fastening means as well as connecting elements for service lines which can be connected at the seat side with mating connecting elements.

From German patent document 94 07 193, a seating arrangement is available in which a television can be mounted on the back of the back rest via a holding device. From this reference, however, there is no teaching of a support element separate from the back-rest frame upon which a holder for at least one support bar of the head-rest support is arranged.

German patent document 34 44 802 (U.S. Pat. No. 4,702, 600) describes a seating arrangement in which the back side of the back rest has a double seat on which a display screen and a cable plate which can be swung outwardly are arranged. The display screen is for example arranged in the head-rest support and the table plate in the back rest, whereby the head-rest support with the back rest form a one-piece structural element.

German patent document 43 25 996, which does not deal with the subject of this invention, does not have a seating arrangement which is relevant to the invention but does have a head-rest support with two support bars in guide sleeves of the upper transverse traverse of a substantially-U-shaped seat frame. A device for height adjustment is connected by fastening hooks with the frame of the rest body.

German patent 19 45 571 has a seating arrangement which is not of the type of the invention in which for the fastening of the head-rest support on the back rest of a vehicle seat a clamp-like rib arrangement is provided which engages over the back rest from its upper part.

German patent document 20 34 832 relates to a seating arrangement which is not of the type of concern here in which for the fastening of the head-rest support on the rest frame, a substantially U-shaped support yoke is provided which is laterally fastened by means of fastening screws to the beam of the rest frame.

German patent document 16 80 264 also describes a seating arrangement which is not of the type involved here, in which the head-rest support is mounted by means of a rib arrangement subsequently to the back rest provided.

German patent document 198 08 404 A1 relates to a seating arrangement which is not of the type here involved in which in a seating structure there is an opening into which a modular component engages to which the head-rest support is affixed.

According to an advantageous refinement of the invention, the support element extends substantially over the entire width and/or over the substantial entire height of the back side of the back rest. With this feature of the invention there is a significant advantage in that the support element can substantially form the back wall of the back rest. Thus, for example, it can be provided that the support element is affixed on a previously cushioned seat rest support structure from its back side forwardly, whereby this fastening step is the last mounting step of the back rest.

The formulation whereby the support element extends substantially over the entire width or substantially over the entire height of the back side of the back rest should, however, also include such embodiments in which only a substantial part of the back side of the back rest is spanned by the carrier element.

The invention thus leaves open the possibility that the support element on its side turned toward the rear vehicle seat will be coated, for example, with a fabric or with leather or optionally also with a cushioning material.

Similarly, the invention also encompasses such support elements as can form at least a portion of the upper part of the back rest.

Also possible with the solution according to the invention is a configuration of the support element such that it forms a closure shell for the back side of the back rest. The rear wall of the back rest turned toward the rear vehicle seat, is then formed substantially by the support element.

According to a further advantageous refinement of the invention, the head-rest support is held releasably by at least one support bar in the holder. Advantageously the head-rest support is held by means of two support bars in the holders which are spaced apart from one another in the transverse direction of the vehicle. The simple releasability of the head-rest support, especially such that the support bars can be fully withdrawn from the holder, is of special significance, for example, where the head-rest support has an appearance-enhancing coating applied thereto or where it is necessary to release the head-rest support for other reasons in a simple manner.

According to a further advantageous feature of the invention, the support element is provided with a control element cooperating with the head-rest support. Such a control element can, for example, be a device for the electrical positioning of the head-rest support in its height, a device for active crash control of the head-rest support or for triggering a head-rest support air bag, etc. The support element offers, therefore, the possibility of arranging such control elements directly on the unit composed of the support element holder and built in the field so that a further improved mounting, especially an improved accessibility is possible.

According to a further advantageous feature of the invention, the support element can be seated on the seat support structure to enable it to be affixed to the seat rest support structure from its back side and to be mounted thereon. This configuration of the invention enables an especially simple mounting of the support element on the seat rest support structure such that this fastening step can be the last mounting step in the fabrication of the seating arrangement.

In addition the invention provides the possibility of amplifying or improving the upholstering of the seat back support structure in that the support element enables complete upholstery of the seat back support structure in that the support element enables complete upholstery of the seat back support structure to be avoided and shorten upholstered regions to be covered somewhat like the application of a blind.

According to a feature of the invention, the support element is affixed to the back-rest frame by means of fastening elements which at the back frame side cooperate with counterfastener elements arranged directly adjacent the seam or the beams. By this arrangement of fastening elements and counterfasteners, an especially simple locking of the support element to the back-rest frame can be obtained. For example, plug fasteners, detent fasteners or the like can be used as the fastening elements for the locking connection of the support element with the back-rest frame to enable a reliable attachment of the support element to the seat back support structure. In addition, such fastening elements enable an especially simple mounting operation for attachment of the support element to the seat back support structure.

According to a further advantageous feature of the invention, the support element is configured substantially as a plate. Such a configuration improves the construction of a back wall of the seat back using the support element.

According to still another advantageous feature of the invention, the support element has connecting elements for supply lines, for example voltage supply lines, signal lines or data lines, pneumatic fluid pressure lines or electrical connection lines which can be connected with counterconnecting elements on the seat back side, for example by plug connections. In this manner, predefined connecting locations can be prepared which allow functional connection with controls cooperating with the head rest and which can provide any necessary operating voltage, signal transmission or succession connections.

BRIEF DESCRIPTION OF THE DRAWING

Further features of the invention are to be found in the dependent claims which have not being mentioned and in the embodiments illustrated in the drawing and described hereinafter.

Therein:

FIG. 1 shows schematically in a perspective view an automobile with a seating arrangement according to the invention, FIG. 2 shows the two individual front seats of such a seating arrangement as shown in FIG. 1, in a detail partially exploded view, FIG. 3 is a rear partial sectional view taken generally in the direction of arrow III in FIG. 2 of the vehicle passenger seat shown on the right hand side of the two seats of FIG. 2, FIG. 4 is a schematic exploded side view of the embodiment shown in FIG. 3 in the direction of the arrow IV.

SPECIFIC DESCRIPTION

Figure 5:
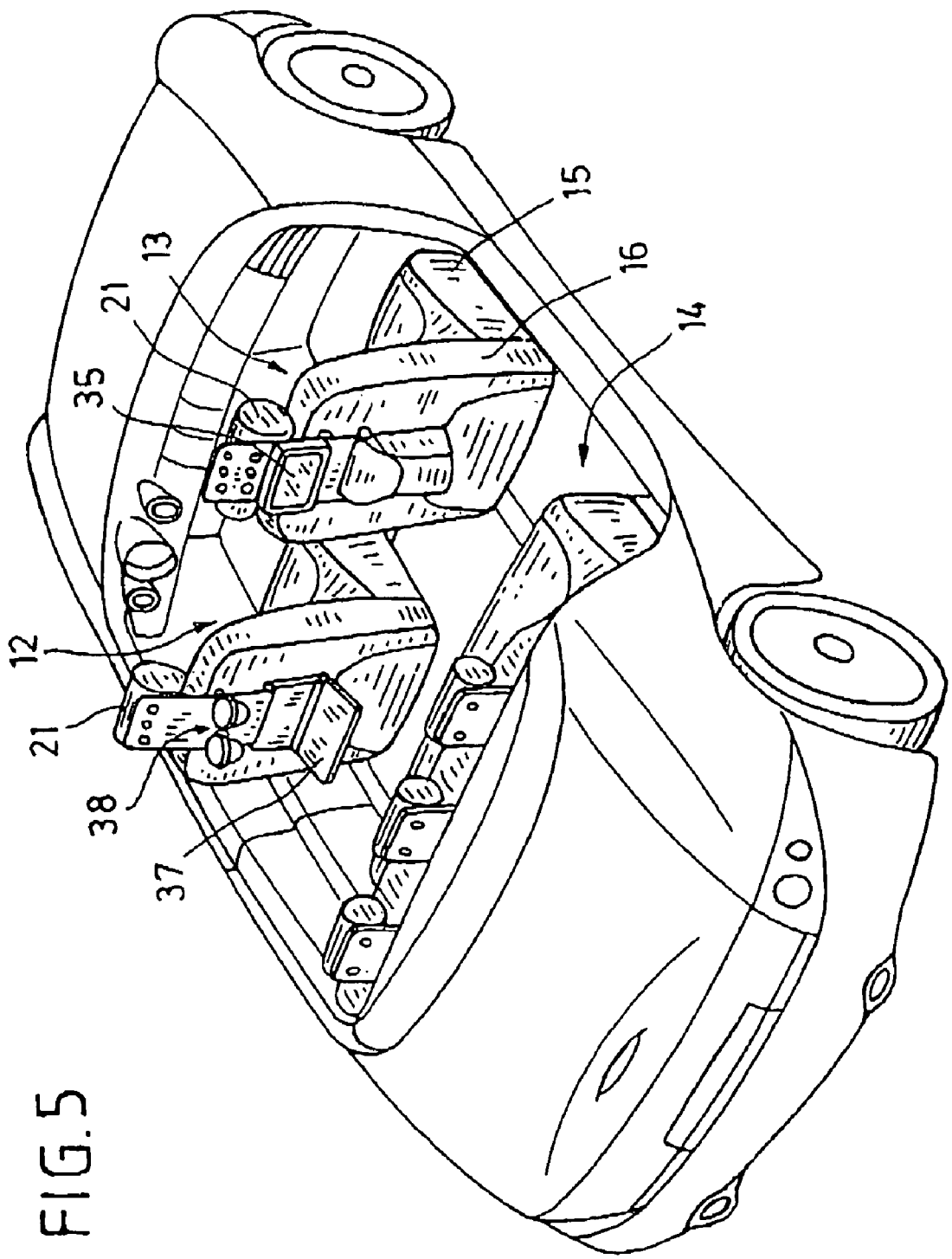
FIG. 5 is a schematic illustration generally according to FIG. 1 of a passenger vehicle with two seating arrangements according to the invention.

In the figures the seating arrangement according to the invention has been indicated in its totality by the reference character 10.

FIG. 1 shows a passenger motor vehicle 11 with a seating arrangement 10 according to the invention comprised of two individual seats 12, 13, whereby for a better overview, the back seats have been omitted. The viewer of FIG. 1 should understand that a back seat assembly 14 will generally be provided behind the two individual seats as has been indicated, for example, in the embodiment of FIG. 5.

Each individual seat 12, 13, has a seating surface part 15 and a back rest 16. The back rests 16 are formed from a seat back support structure 17 which can be configured as a seat back frame 18 and has generally the configuration of an inverted U. The seat back frame 18 is especially apparent from FIG. 3 and comprises two substantially vertically oriented lateral beams 19a, 19b, and a transversely extending traverse 20 which connects the other upper ends of the beams. The beams or columns 19a and 19b are pivotal about the pivot axis 32 formed at the lower connecting regions of the beam ends and extending substantially transversely to the travel direction X so at to enable a swinging of the back rest 16 which can be arrested in a plurality of angularly displaced positions. Not illustrated in FIGS. 3 and 4 are spring elements which provide a certain elasticity for the back rest and the upholstery which, however, has been indicated in FIGS. 1 and 2.

To fasten a head rest 21 to the back rest 16 of the seat 12 or 13, the head rest 21 typically has two standard support bars 22a and 22b, and the traverse 20 is provided in its central region with corresponding openings and guides.

According to the invention, however, a support element 24 is provided which is separate from the back frame 18 and which, as is best made clear in FIGS. 3 and 4, has a holder 23 for the support bars 22a, 22b of the head rest 21 and a region, field, or recess 26 into which a functional unit 27 can be built. The holder 23 can for example be arranged on a force-conducting component 25 which is configured for example as a transverse beam. The region 26 into which the unit 27 can be built is located on a back side 33 of the back rest 16 facing in the direction of the back seat 14.

The support element 24 in the embodiment according to all of the figures is substantially a plate and has a width B which corresponds substantially to the width BR of the back rest 16. The support element 24 has in addition a height H which corresponds substantially to the height HR of the back rest 16. A height H of the support element 24 should correspond substantially to the length L of the beams 19a, 19b.

To fasten the support element 24 on the support structure 17 of the seat back, fastening means 28 are provided which are arranged at the support element side and cooperate with counterfastener means 29 arranged on the back-rest frame side. FIGS. 2 and 4 show that the fastening means 28 and counterfastener means 29 are aligned with one another in the fastening direction so that they can be connected to one another and the support element 24 mounted on the back side of the back frame 18 on the seat back 16. In this manner it is possible to prefabricate the back rest 16 practically completely and provide the back frame 18 with upholstery and only as a last mounting step attach the support element 24 to the back frame 18.

In addition, via connecting elements which have not been shown and can be provided on the support element 24, a connection with service lines is possible whereby the connecting elements on the support element side can be brought into connection with counterconnecting elements on the back rest side and especially on the back frame side. In case it is required that a functional unit, for example, an imaging screen or television display screen] be provided and supplied with electrical current, the place into which the functional unit can be built will already have corresponding connections, especially plug connectors so that the functional unit need only be plugged in to operate. The connectors in the mounting field 26 of the support element can be supplied with the requisite operating voltage via a connecting element on the support element side which can connect to a counterconnecting element on the back side upon the mounting of the support element 24 on the back frame 18.

As functional units 27, various devices can be conceived of, FIGS. 3 and 4 and the right-hand individual seat 13 in FIGS. 1 and 2 show a swingable platform or table 30 which can pivot about the pivot axis 31 and can serve for example as a cup or container holder. In the left-hand individual seat of FIGS. 1 and 2, a screen 35 has been shown as part of the functional unit 27 built into the space 26. A folder or pocket as mounted on the left individual seat 12 in FIGS. 1 and 2 can also be a functional unit in the sense of the invention.

The corresponding mounting region 26 for the image screen 35 or for the storage pocket 36 is in the sense of the present patent application located directly behind the mounting surfaces for the support element 24 which is provided with the functional components 27, 35, 36. The mounting region 26 can however be formed also as a holder or fastening device for a functional unit.

FIG. 5 shows a functional unit which serves as a resting surface 37 or as a cup holder 38 and in the right hand individual seat 13 as an image screen 35 as examples of the functional units. Mirror elements, especially a makeup mirror and nets serving as pockets to receive newspapers, magazines or the like are also possible. The functional unit 27 may also represent such devices which serve to provide a certain functionality to the user in a rear seat From FIGS. 3 and 4 it can be seen that the force absorbing components of the support element 24 constituted by the cross beam 25 is significantly more stable than the transverse traverse 20 of the seat back 18. The forces which are effective on the cross beam 25 in the case of a crash are delivered directly by the support bars 22a, 22b to the force conducting component 25 and then directly into the beams 19a and 19b so that distortion in the case of a crash can then be avoided. The fastening elements 28 serve therefore for the mounting to the counter fastening elements which are directly located on the columns 19a, 19b or at least are arranged directly against the columns in a manner to ensure conduction of the forces which arise in the case of a crash to the columns over a short path.

The support element 24 can in addition function as a blind-like or shutter-like component which covers fastening regions of the upholstery, for example fastening edge regions 39 of the upholstery in the region of the upper back part 40 or fastening edge regions 41 of the upholstery in the region of the side cheeks of the back rest 16 so that the fastening of the upholstery to the back frame is supplied. The support element 24 can in this manner act as an optically blocking element to cover the fastening regions 39 and 41 which should not be visible and at the same time enable simplified attachment of the upholstery.

The number of fastening elements and counter fastening elements 28, 29 has been limited to four in the embodiment shown in the figures. Basically, however, a greater number of fastening elements is also possible, the fastening elements being configured either as point-like or even strip-like elements.

Dependent upon the configuration of the support element 24, not only can the upper back part 40 of the back rest 16 be structured to be more stable but the back rest 16 as a whole can have an increased stiffness to torsional stress. The force conducting component 25 can also extend over the entire height H of the support element 24. For the case in which the support element 24 is configured with corresponding stability, the transverse traverses 20 required by the state of the art in the back-rest frame 18 can also be eliminated.

What is decisive is that the holder 23, the field 26 built into support element and the support element 24 can form a structural unit which is preassembled and then mounted as a single unit on the back rest support structure 17 of the seat 12 or 13.

The support element can for example be comprised of plastic whereby different components of the support element 24 can also be comprised of different materials. It is also advantageous if the support element 24 is configured to form a portion of the back wall of the back rest 16 of the seat which provides directly an outer covering surface of the seat back 16.

Alternatively however it will be self-understood that it is also possible to provide the support element 24 on its back side 33 with an upholstery.

The invention claimed is:

1. A seating arrangement for a motor vehicle, the seating arrangement comprising:
    a front seat having a back rest provided with a back-rest support structure having a pair of transversely spaced and generally vertical columns each having a rearwardly directed back side;
    a rear seat facing the back sides of the columns of the front seat;
    a head rest;
    a support element separate from the back-rest support structure, fittable between the columns, and formed with:
        a holder for at least one support bar of the head rest,
        a built-in field for receiving at least one functional unit to be mounted on a back of the front seat, and
        a force-transmitting transverse beam made of metal, extending transversely between the columns, and bearing forwardly against the back sides; and
    means for fixing the support element against the back sides of the columns.

2. The seating arrangement defined in claim 1 wherein the support element is a frame extending substantially a full width of the back rest and substantially a full height of the back rest, the transverse beam having ends extending transversely past the frame and bearing axially forward on the back sides.

3. The seating arrangement defined in claim 1 wherein the bar of the headrest is releasably held in the frame.

4. The seating arrangement defined in claim 3, wherein the support element is provided with a control element cooperating with the head rest for adjusting same.

5. The seating arrangement defined in claim 4 wherein control element is an electrical height adjuster for the head rest.

6. The seating arrangement defined in claim 1 wherein the support element forms a rear surface of the front seat when it is mounted on the support structure.

7. The seating arrangement defined in claim 1 wherein the columns are pivotable about a horizontal axis transverse to a vehicle travel direction and can be locked in a plurality of angularly offset use positions.

8. The seating arrangement defined in claim 1 wherein the support element is a frame bridging between the columns.

9. The seating arrangement defined in claim 1 wherein the transverse beam is juxtaposed with the head rest for transmitting force impinging the head rest in case of a crash to the columns.

* * * * *